（12）United States Patent
DiMarzio et al.

(10) Patent No.: US 7,471,450 B2
(45) Date of Patent: Dec. 30, 2008

(54) CONFOCAL REFLECTANCE MICROSCOPE SYSTEM WITH DUAL ROTATING WEDGE SCANNER ASSEMBLY

(75) Inventors: Charles M. DiMarzio, Cambridge, MA (US); William C. Warger, II, Boston, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 11/244,814

(22) Filed: Oct. 6, 2005

(65) Prior Publication Data

US 2006/0072189 A1   Apr. 6, 2006

Related U.S. Application Data

(60) Provisional application No. 60/616,483, filed on Oct. 6, 2004.

(51) Int. Cl.
*G02B 21/06* (2006.01)
*G02B 21/00* (2006.01)

(52) U.S. Cl. .................. 359/388; 359/368; 359/385; 359/831

(58) Field of Classification Search ......... 359/211–216, 359/368–390, 831–837, 431; 235/462.35
See application file for complete search history.

(56) References Cited

U.S. PATENT DOCUMENTS

| | | | | | |
|---|---|---|---|---|---|
| 2,975,668 | A * | 3/1961 | Eckel | ...................... | 359/211 |
| 3,013,467 | A | 12/1961 | Minsky | ...................... | 359/368 |
| 3,226,721 | A * | 12/1965 | Gould | ...................... | 343/754 |
| 3,378,687 | A * | 4/1968 | Schepler | ................ | 250/203.4 |
| 4,515,447 | A * | 5/1985 | Weimer et al. | ............ | 359/388 |
| 4,572,662 | A * | 2/1986 | Silverman | ................ | 356/5.15 |
| 4,682,222 | A * | 7/1987 | Smith et al. | .............. | 348/164 |
| 5,227,910 | A * | 7/1993 | Khattak | .................... | 359/211 |
| 5,272,325 | A * | 12/1993 | Peng | .................... | 235/462.35 |
| 5,430,571 | A * | 7/1995 | Witteveen | ................ | 359/216 |
| 5,760,951 | A * | 6/1998 | Dixon et al. | ............... | 359/385 |
| 5,788,639 | A | 8/1998 | Zavislan et al. | ........... | 600/476 |
| 5,880,880 | A | 3/1999 | Anderson et al. | .......... | 359/385 |
| 6,072,625 | A * | 6/2000 | Kitahara et al. | ........... | 359/388 |
| 6,344,937 | B1 * | 2/2002 | Sparrold et al. | ........... | 359/837 |
| 6,761,455 | B2 * | 7/2004 | Sumiya | .................... | 351/221 |
| 7,035,004 | B2 * | 4/2006 | Weiss | ...................... | 359/388 |

OTHER PUBLICATIONS

Sung et al., Fiber-optic confocal reflectance microscope with miniature objectiver for in vivo imaging of human tissue,; IEEE Transactions on Biomedical Engineering, vol. 49, No. 10, pp. 1168-1172, Oct. 2002.

(Continued)

*Primary Examiner*—Thong Nguyen
(74) *Attorney, Agent, or Firm*—Weingarten, Schurgin, Gagnebin & Lebovivi LLP

(57) ABSTRACT

A confocal reflectance microscope system incorporates a dual-wedge laser scanner assembly. The scanner assembly incorporates a pair of rotatably mounted prisms, each prism having an angle selected to deviate a light beam from a light source by a desired angle. Each prism is mounted for rotation at a desired speed of rotation and in a desired direction to scan the light beam over the target. An image is built up from successive reflected signals returned from the target.

21 Claims, 6 Drawing Sheets

OTHER PUBLICATIONS

Kino et al., Performance of dual axes confocal microscope for in vivo molecular and cellular imaging,;SPIE vol. 5324, Biomedical Optics and Imaging, vol. 5324, pp. 35-46.

Knittel et al., Endoscope-compatible confocal microscope using a gradient index-lens system; Optics Communications 188(5-6):267-273, 2001.

Charles J. Koester, Scanning mirror microscope with optical sectioning characteristics: applications in opthalmology; Applied Optics, vol. 19, pp. 1749-1757, 1980.

Rajadhyaksha et al., Video-rate confocal scanning laser microscope for imaging human tissues in vivo, Applied Optics, vol. 38:2105-2115, 1999.

* cited by examiner

CONFOCAL REFLECTANCE MICROSCOPE SYSTEM WITH DUAL ROTATING WEDGE SCANNER ASSEMBLY

CROSS REFERENCE TO RELATED APPLICATIONS

This application claims the benefit under 35 U.S.C. § 119(e) of U.S. Provisional Patent Application No. 60/616,483, filed on Oct. 6, 2004, the disclosure of which is incorporated by reference herein.

STATEMENT REGARDING FEDERALLY SPONSORED RESEARCH OR DEVELOPMENT

N/A

BACKGROUND OF THE INVENTION

A confocal microscope uses a point source of light, such as a focused laser beam, to illuminate a point within the sample. Scattered light from the focused spot is then imaged onto a detector through a point aperture such as a pinhole. The light source, illuminated spot and detector aperture lie in optically conjugate focal planes. The size of the detector aperture is matched to the size of the illuminated spot, thereby blocking any light that is not contributed from the back-scatter of the focused spot. By scanning the focused spot over the sample, the detector only receives light from the thin plane at the focus. Light from out-of-focus planes is rejected or spatially filtered by the detector aperture. Optical sectioning is created as long as the sample is optically transparent or translucent. Consequently the confocal microscope can create non-invasive images of thin sections, within turbid, scattering media without having to cut the sample physically into thin slices.

Fiber-bundle based confocal microscopes are capable of imaging biological tissue in near real time, but with a lateral resolution of 2 µm, limited by the fiber spacing, and an axial resolution of 10 µm. K. B. Sung, Fiber optic confocal microscope with miniature objective for in-vivo imaging. *Proceedings of the* 2002 *IEEE Engineering in Medicine and Biology* 24th *Annual Conference and the* 2002 *Fall Meeting of the Biomedical Engineering Society* (*BMES/EMBS*), 3:2312-2313, 2002.

An endoscope-compatible confocal laser scanning microscope has been developed that utilizes a gradient index lens system. Gordon Kino, Thomas Wang, Chris Contag, Michael Mandell, and Ning Chan, Performance of dual axes confocal microscope for in vivo molecular and cellular imaging; *Progress in Biomedical Optics and Imaging*, 5(13):35-46, 2004. J. Knittel, L. Schnieder, G. Buess, B. Messerschmidt, and T. Possner, Endoscope-compatible confocal microscope using a gradient index-lens system; *Optics Communications*, 188(5-6):267-273, February 2001. This system has a reported lateral resolution of 3.1 µm and an axial resolution of 16.6 µm, which is able to resolve some cellular structures in tissues inside the body. However, these resolutions are not suitable for imaging skin.

Line-scanning confocal microscopes have demonstrated excellent imaging capabilities of the human cornea in vivo. C. J. Koester, Scanning mirror microscope with optical sectioning characteristics: Applications in ophthalmology; *Appl. Opt.*, 19:1749-1757, 1980. The line scanner shows promise in imaging skin. However, the line scanner is only confocal in one dimension, thereby decreasing the lateral resolution of the direction of the array.

Raster scanning confocal microscopes for in-vivo imaging are known. See U.S. Pat. Nos. 5,788,639, and 5,880,880. See also M. Rajadhyaksha, R. R. Anderson, and R. H. Webb, Video-rate confocal scanning laser microscope for imaging human tissues in vivo; *Appl. Opt.*, 38:2105-2115, 1999. Such instruments provide good imaging quality with resolutions comparable to that of standard histopathology images (0.5-1.0 µm lateral resolution and 2-5 µm axial resolution). The beam scanning mechanism of these microscopes includes a polygonal mirror, galvanometric mirror, and respective telescopes to place the scan in the focal plane of he objective. Thus, the optics in the beam scanning mechanisms of these instruments tend to be large and bulky and difficult to use.

SUMMARY OF THE INVENTION

The present invention relates to a confocal reflectance microscope capable of producing images of tissue such as skin with a quality comparable to that of current commercial instruments, but with a smaller size and at lower cost. The device uses a scanner system in which the optical path is passed through two wedges, which are rotated about the beam axis at variable speeds, resulting in coverage over a circular area.

The present microscope can be used by dermatologists to locate the margins of basal-cell carcinomas and for other dermatological applications. The device is also amendable to endoscopic applications, such as examination of the oral mucosa.

DESCRIPTION OF THE DRAWINGS

The invention will be more fully understood by reference to the following detailed description of the invention in conjunction with the drawings, of which.

DETAILED DESCRIPTION OF THE INVENTION

Figure 1:
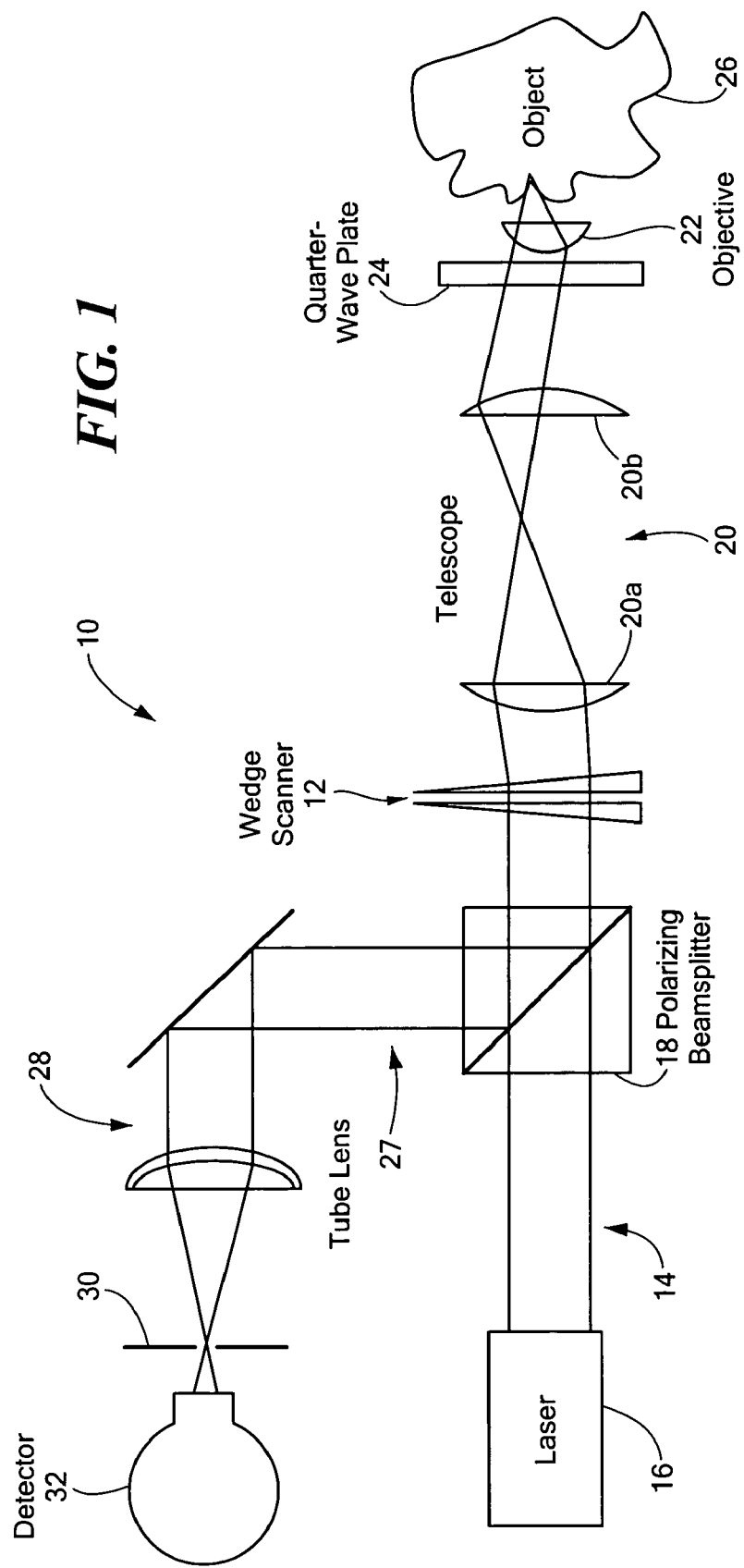
FIG. 1 is a schematic illustration of a confocal reflectance microscope incorporating a dual rotating wedge scanner assembly according to the present invention.

A confocal reflectance microscope system 10 with a dual-wedge scanner assembly 12 is illustrated in FIG. 1. An optical path 14 begins at a light source 16, such as a laser, which has a strong degree of polarization. The power of the laser can be controlled to permit varying the depth of imaging as known in the art. The beam on the optical path passes through a polarizing beam splitter 18, with P polarization, and then through the dual rotating wedge scanner assembly 12, described further below. Next, the beam passes through a telescope lens assembly 20 that properly aligns the beam with the pupil of an objective lens 22 or lens assembly of the microscope. En route to the objective, the path passes through a quarter-wave plate 24, having an axis oriented at 45° to the laser polarization, after which the objective focuses the beam onto the sample or object 26.

The light is either absorbed, scattered, or reflected at various locations within the sample. Some of the light ultimately returns back into the microscope, perhaps after multiple scattering and absorption. This light passes through the objective, the quarter-wave plate, and the scanner assembly. On the return path, the light has passed through the quarter-wave plate twice, resulting in a half-wave shift of the polarization component at +45° compared to that at −45°. The result is that the incident P polarization state is converted to S, provided that the returning light retains its state of polarization as it interacts with the sample. This will be the case for light that has been scattered only once. Light that has been multiply scattered has more random polarization, and only a fraction of it is in the S state. The S-polarized light is reflected by the beam splitting prism 18, toward a detector 32, such as an avalanche photo diode (APD), rather than transmitting straight back toward the laser.

The lens assembly 20 illustrated in FIG. 1 is shown as a simple magnifying telescope using two plano-convex lenses 20a, 20b. Alternatively, a custom objective can be designed to place the scanner assembly in the objective pupil. If the telescope lens assembly does not also magnify the beam, a separate beam expander would be required.

On the path 27 toward the detector, the light passes through a further lens or lens assembly 28, which serves as a tube lens of the microscope, to focus the scattered light through an aperture 30 and onto the detector 32. The aperture is located at a point conjugate to the focus of the laser on the sample, to pass only light scattered from the focus, and thus to reject light that is scattered from outside the focal region.

Figure 2:
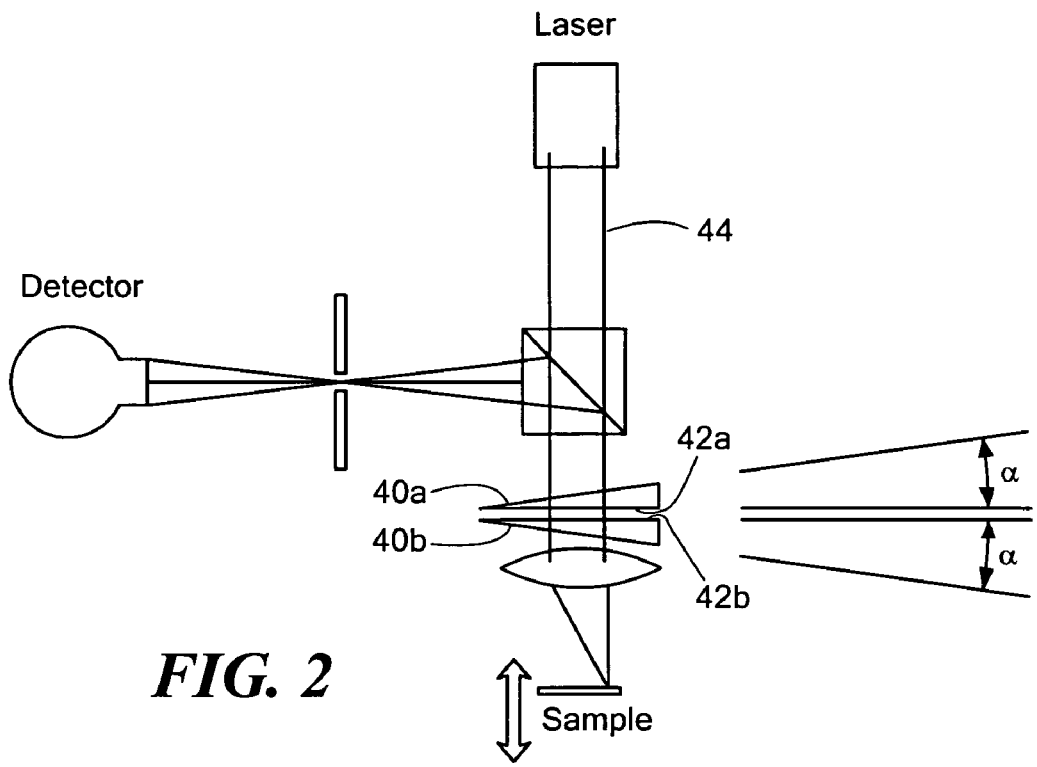
FIG. 2 is a further schematic illustration of a dual wedge scanner assembly.
Figure 3:
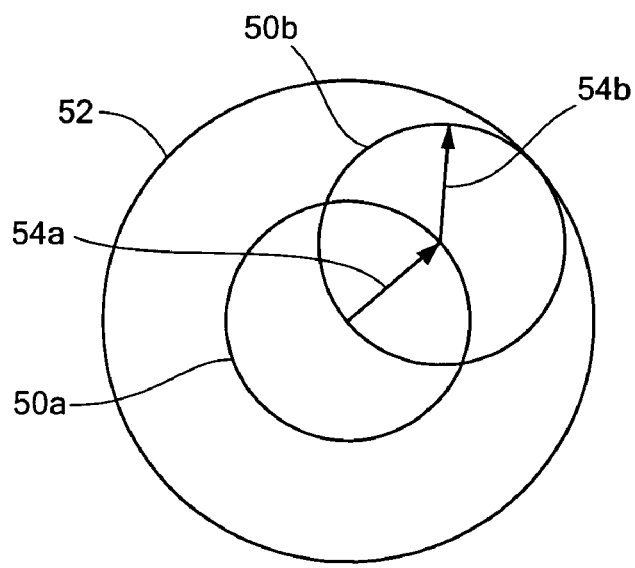
FIG. 3 is a diagram indicating an area of output for a beam of light from the dual wedge scanner assembly of FIG. 2.

The concept of the dual wedge scanner assembly is discussed further in conjunction with the schematic diagram of FIG. 2. The dual wedge scanner assembly incorporates two prisms 40a, 40b placed with flat surfaces 42a, 42b facing each other and normal to the incident light beam 44. Each prism is movably mounted to rotate about the incident beam axis. To a first approximation, each prism, with a wedge angle α, deviates the beam by an angle (n−1)α. Thus, the output 50a of the first prism lies on a cone of angle (n−1)α, where n is the index of refraction of the prism material. (See FIG. 3.) The output 50b of the second prism lies on a second cone of the same angle, centered on the first beam. Thus, on a screen some distance from the scanner, the beam can be positioned anywhere within a cone 52 of angle 2(n−1)α, as shown in FIG. 3.

Simply then, the beam location at a screen a distance z away, is given approximately by:

x≈z(tan α cos θ₁+tan α cos θ₂)

y≈z(tan α sin θ₁+tan α sin θ₂)

Figure 4:
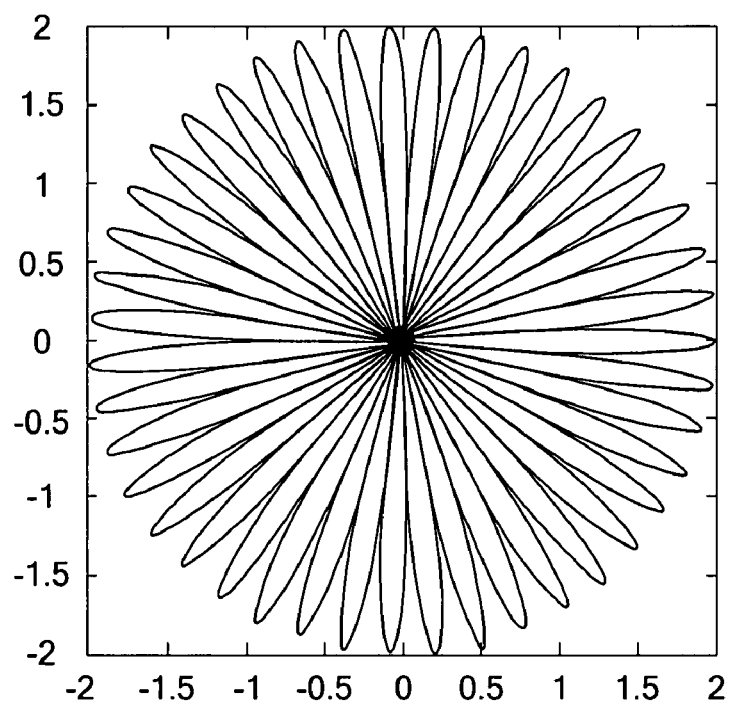
FIG. 4 is a diagram of a beam pattern from two counter-rotating prisms.
Figure 5:
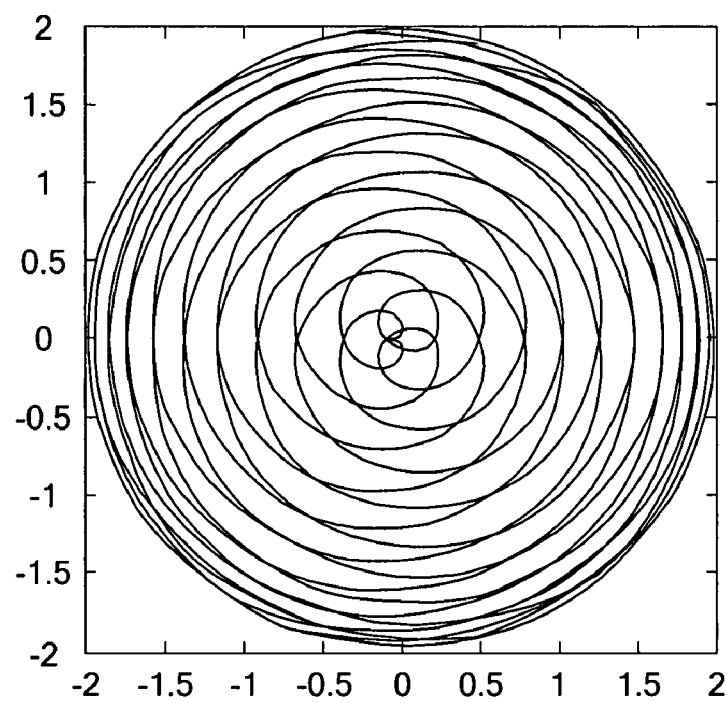
FIG. 5 is a diagram of a beam pattern from two prisms rotating in the same direction.

If the two prisms are counter-rotating at equal speeds $\theta_1=\omega t$ and $\theta_2=-\omega t$, the beam traverses a straight line, at an angle depending on the relative starting points of the wedges. If the rotation speeds are slightly different, $\theta_1=\omega_1 t$ and $\theta_2=-\omega t$, a "flower petal" pattern is produced. See FIG. 4. In contrast, if the prisms are rotated in the same direction at the same speed, $\theta_1=\omega t$ and $\theta_2=\omega t$, the pattern is a circle, with a radius determined by the relative angle between the prisms. If the speeds are slightly different, $\theta_1=\omega_1 t$ and $\theta_2=\omega_2 t$, the angular relationship changes with time, and a spiral pattern is produced, as shown in FIG. 5.

Preferably, the wedge angle α is the same for both prisms, although it does not have to be the same. If the angle were different, the system would not be able to collect points within the center of the image. Referring to FIG. 3, the length of the vector 54a from the center of the largest circle is based on the angle of the first prism through which light passes. The second vector 54b that goes from the end of the first vector to the smaller, off-centered circle is based on the angle of the second prism. If the angle of the second prism were larger or smaller, the small off-centered circle would be larger or smaller, thereby precluding collection of around the center. Only points that are along the second circle that are from the addition of the first vector and the second vector can be collected. If the vectors are of different sizes, the addition of the two vectors can never reach the origin.

A more detailed analysis of the rotation uses a ray-tracing concept through each of the four surfaces of the wedges. This permits an exact analysis of the scan pattern, including errors from the tilt of the prisms, disparities in angle, misalignment of the incident beam, and errors in registration of the angles of rotation.

The exact position of the scanned beam is given by repeatedly applying:

$$\vec{V}_{j+1} = \frac{n_{j+1}}{n_j}\vec{V}_j + \left[\sqrt{\left(1-\left(\frac{n_{j+1}}{n_j}\right)^2\left(1-\left(\vec{V}_j\cdot\vec{N}_j\right)^2\right)\right)} - \frac{n_{j+1}}{n_j}\vec{V}_j\cdot\vec{N}_j\right]\vec{N} \quad (1)$$

for each surface. In this equation, $n_j$ is the index of refraction of medium j, $V_j$ is a unit vector describing the ray direction in this medium, and $N_j$ is a unit vector describing the normal to the interface between media j and j+1.

Figure 6:
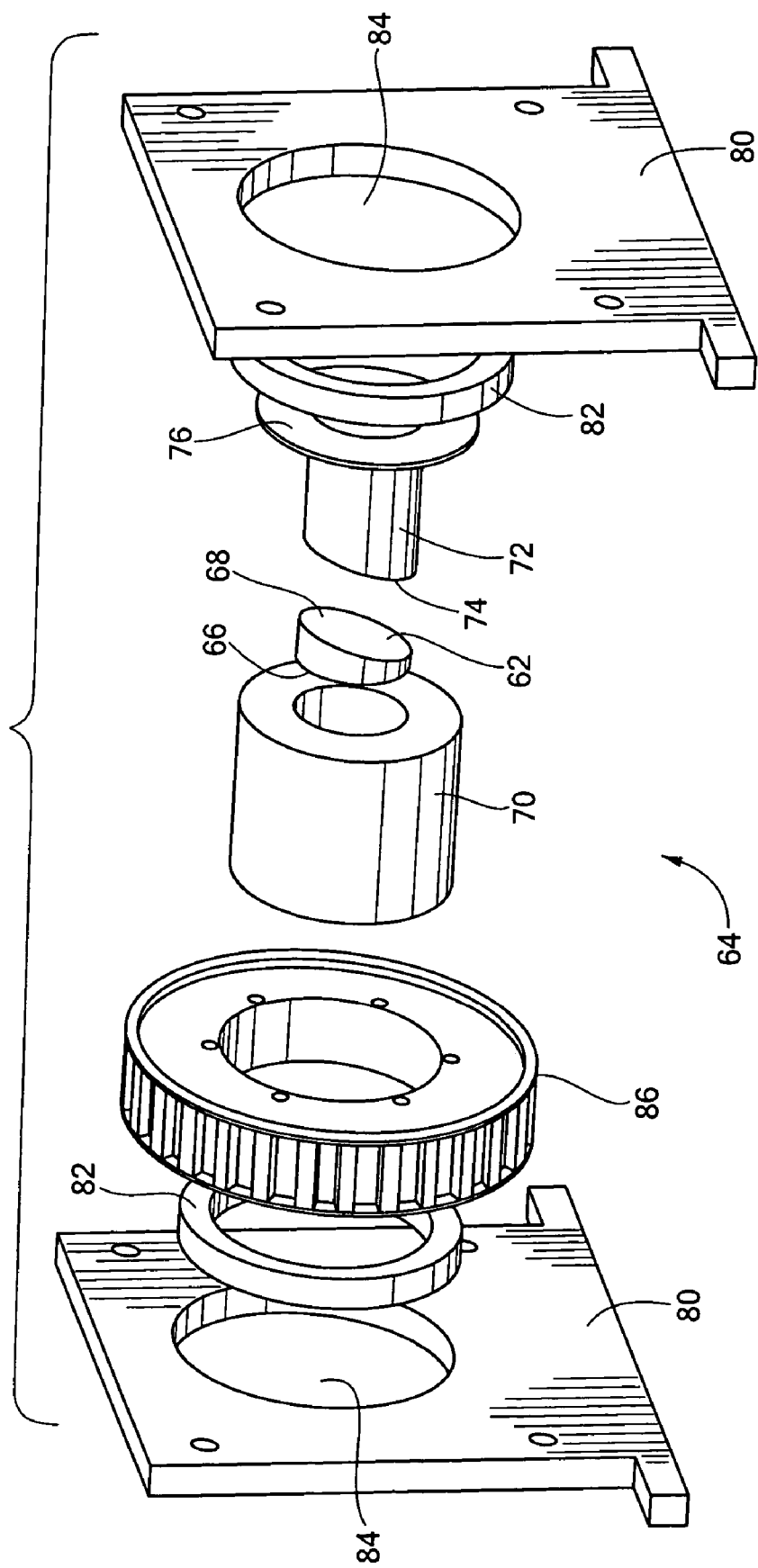
FIG. 6 is an exploded isometric view of a rotatable housing assembly for one prism.

Referring to FIG. 6, each prism 62 is disposed in a housing 64 mounted for rotation. Each prism is a wedge-shaped piece of circular clear optical grade glass coated with an anti-reflection coating. One side 66 is flat and the other side 68 is sloped at an angle. In one embodiment, a wedge angle 11° 22' was used. The angle is chosen to create the desired deviation angle of the beam. The angle is preferably chosen to be as large as possible within the physical limitations of the microscope to provide the largest field of view. Physical limitations include the size and configuration of the housing for the prisms, the size of the lenses for the telescope (if used), and the diameter of the pupil of the objective. The housing for the prism includes a hollow cylinder 70, for example, of aluminum. The prism is inserted into the interior of the cylinder and retained therein in axial alignment with the cylindrical axis in any suitable manner. For example, a lip (not visible in FIG. 6) extends into the opening of the cylinder on one side. The prism is inserted into the opening of the cylinder and the flat side of the prism is pressed against this lip. A hollow sleeve 72, such as of aluminum, is inserted into the opposite end of the cylinder from the lip and clamps the prism into place within the cylinder. The side 74 of the sleeve that is inserted into the cylinder is machined to an angle equivalent to the slope of the prism. A flange 76 extends from the sleeve to facilitate bolting to the hollow aluminum cylinder.

In one exemplary embodiment, the prism diameter is 25.4 mm and the thickness of the largest side is 8.11 mm. Suitable cylinder dimensions are 25.4 mm inner diameter and 50.8 mm outer diameter. The inner diameter of the sleeve is 23.4 mm and the outer diameter is 25.4 mm.

The prism housing is mounted for rotation in any suitable manner to a supporting structure, such as a pair of parallel plates 80. For example, in one embodiment, two deep-groove, single row ball bearings 82 are attached to the outer surface of the prism housing, each flush with the sides of the hollow aluminum cylinder. The inner chases are allowed to spin while the outer chases are fixed to the parallel plates. The outer surfaces of the plates are flush with the outer surfaces of the bearings. A hole 84 is cut into each plate to allow the outer chases of the bearings to be securely fastened. These plates, made for example of aluminum, are securely attached to the microscope table and to each other for increased stability and to eliminate vibration.

Figure 7:
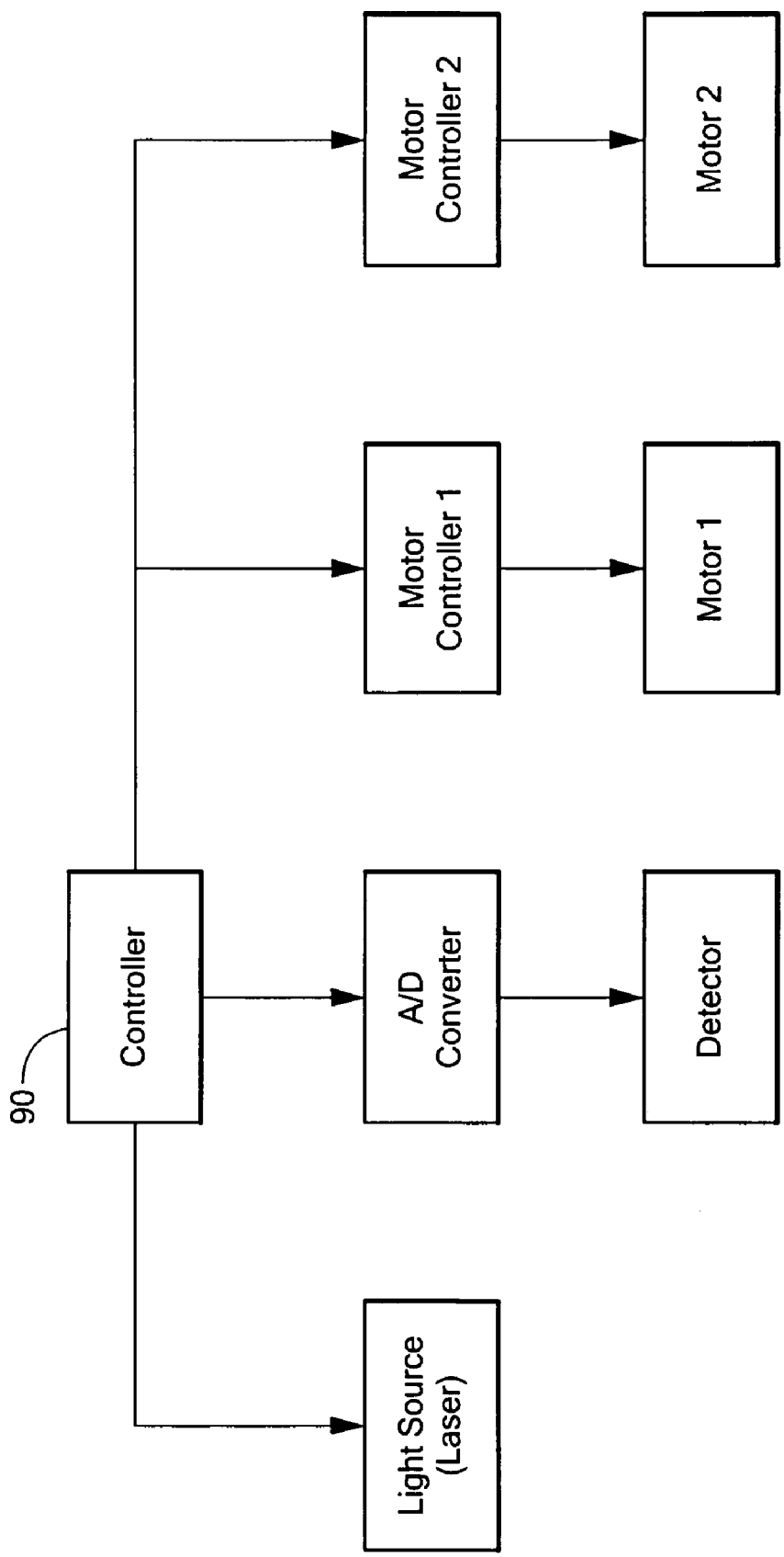
FIG. 7 is a block diagram of a control system of the confocal microscope with dual wedge scanner assembly of the present invention.

To actuate rotation of the housing, in one embodiment, a timing belt pulley 86 is attached on the center of the prism housing in any suitable manner, such as by an SDS quick connect bushing. This pulley accepts a timing belt (not shown) that is driven by a motor (see FIG. 7). An identical pulley is attached in a similar manner onto the shaft of the motor. Upon actuation of the motor, the housing rotates.

A controller 90, such as a suitable processor or computer, is provided in communication with the microscope for image acquisition and display. See FIG. 7. Three pieces of data are required from the microscope for the controller to generate an image. These include the angular rotation of each prism and the intensity value of the light measured by the detector.

Encoders attached to each motor are used to determine the position of each prism at any point in time. For example, an encoder can provide 500 counts per revolution, allowing 500 possible locations for each prism. Each encoder tick is input into the count clock line of an eight bit parallel output counter. Each counter contains a shift register at the output so a specific count value can be stored when the register clock pin is activated. To evaluate all of the counts, e.g., 500 counts, from the encoder, two additional eight bit counters are utilized with one of the counters enabled by the ripple carry output of the original counter. When the ripple carry outputs a 0, the second counter counts from 0 to 255 and then sets the ripple carry to 1, and when the ripple carry outputs a 1, the second counter counts from 0 to 245. The ripple carry stays at 1 until the index channel on the encoder pulses, signifying the revolution is complete.

The analog signal from the detector is digitized using an A/D converter. The converter has an eight bit parallel output, allowing 256 discrete intensity values, with an incorporated register similar to the counters. The resolution is controlled by a reference input that is set using a potentiometer before imaging takes place.

Figure 9:
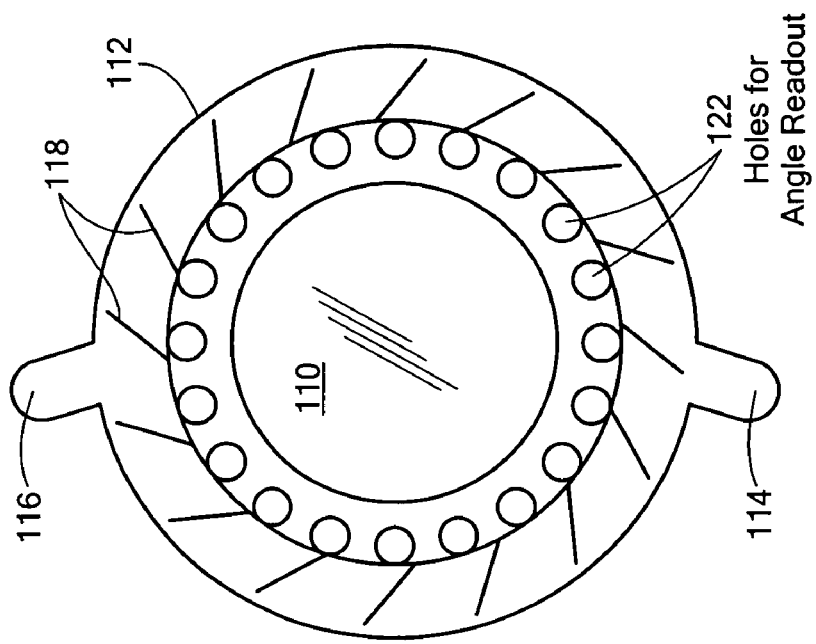
FIG. 9 is a schematic cross-sectional view of the rotatable mounting of FIG. 8.
Figure 8:
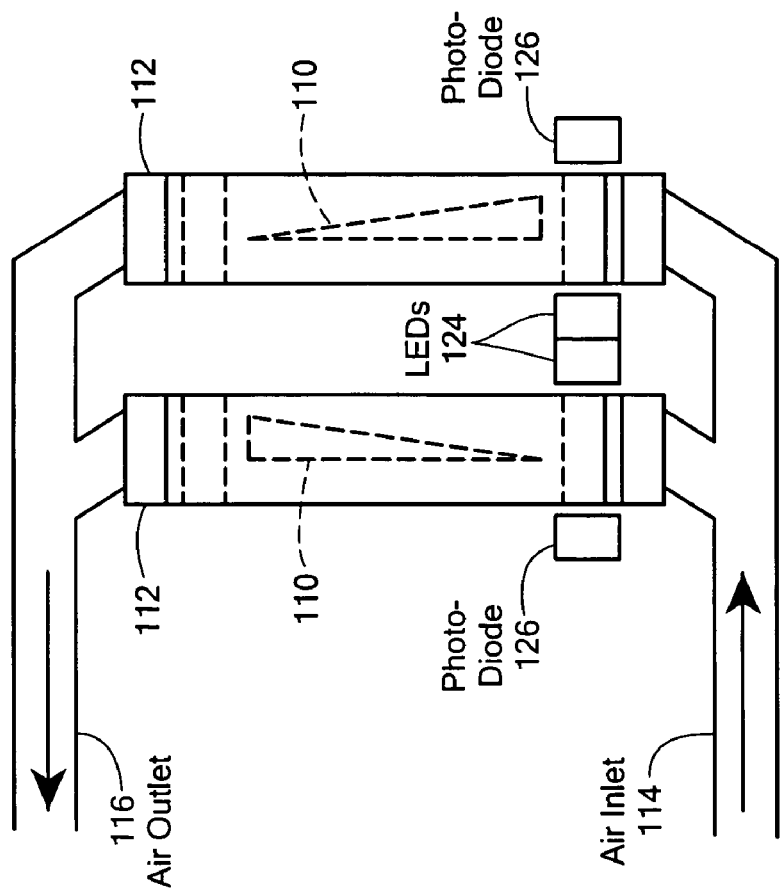
FIG. 8 is a schematic side view of a further embodiment of a rotatable mounting for two prisms.

In another embodiment, an air bearing system is used to rotate the prisms. Referring to FIGS. 8 and 9, each prism 110 is disposed for rotation in a housing 112. An air inlet 114 and an air outlet 116 direct air past vanes 118 within the housing to rotate the prism. An optical encoder can be used to detect the angular position of each prism. For example, openings 122 in a plate periodically allow transmission of light from an LED 124 to an opposed photodiode 126, which is in communication with the controller 90, described above. An air bearing system is particularly suitable for greater rotation speeds, such as speeds over 100,000 rpm. Air bearings can also reduce the overall width of the device by incorporating the spinning mechanism along the length of the device rather than radially adjacent. This configuration can provide a desired frame rate for in vivo imaging and decrease the overall complexity to produce a hand-held device. In another embodiment, a Hall-effect magnetic field sensor can be used to determine the angular position.

Since multiple devices are recording data simultaneously, the controller controls the timing of the entire data acquisition system. The controller determines which device has control of a data bus at any specific time. The encoder positions and intensity values are determined and stored into their own specific registers until addressed by the controller to be passed onto a USB module via the data bus. The receiving end of the data bus is a USB 2.0 module.

The image acquisition and signal processing system may be broken down into small functions within a C++ program, which takes care of queuing data, laser position calculations, intensity to color conversion and image display.

The counter and intensity values that have been sent via the USB port may be captured by the program and placed in three separate queues for storage. This queue system creates a buffer between the algorithms and the USB interface. This feature is useful to prevent the loss of data if the computer is engaged with other processes and cannot complete the calculations in an adequate amount of time. Instead, a backlog of data waits for the program, so that the computer can catch up when the processor resources are freed up.

Once the data is in the queue, the first of the four processing algorithms takes the top data value from each of the three queues and assigns it to one of three variables. The first of the functions that processes the data is the position algorithm. This function is to convert the counter value sent over the USB port of an (x,y) position usable by the function that draws the image to the screen. To obtain a value for x and y, the counter value is converted from a counter number to the angle that represents the prisms' orientation. In this process, the angle counts are converted to radians and then the position of the scanned beam is calculated according to Equation 1. The x and y values are set as temporary variables while the program waits for the next function to complete its calculations.

The next function is the intensity conversion function. The data from the A/D converter is a number that represents a voltage level linearly related to the amount of light returned from the sample. A higher value is represented by a lighter grayscale value. The intensity conversion function assigns the count a relative image color based on an expected range of values from the A/D converter, such that a value of 256 results in white and 0 results in black.

Once both intensity and location data have been formulated for a given pixel, the data can be used to create a meaningful image on the screen. Any suitable software function can be used to draw the images to the screen.

As noted above, the choice of speeds and direction of rotation for each of the prisms determines the scan pattern and the way in which it develops in time. Thus, the scan generated by the dual wedge scanner is non-uniform.

The software maps the collected data onto a regular array, and interpolation can be used to fill in missing pixels or deal with over-sampled pixels. Some parts of the array are sampled more densely than others, and the density everywhere increases with imaging time, at a rate dependent on the scan speeds. The interpolation algorithm can be adjusted dynamically as the data density increases. Sample scan patterns are shown in FIGS. 4 and 5. The scan pattern that results is dependent on three parameters: relative scan direction, overall scan speed, and relative scan speed.

The full image can develop from successive samples in different ways. For example, consider a single scan to be defined by one rotation of the faster wedge. In the case of rotation in the same direction, the pattern is best approximated by a circle at a given distance from the center, and in the case of counter-rotation, it is closer to a line through the center. If the speeds are closely matched, consecutive scans are close in location, and the pattern builds up slowly with dense sampling in certain regions early, and in other regions later. If the speeds are quite different, then the single scans are more widely dispersed, and the whole field is sampled coarsely early in the pattern, with increasing sample density developing with time. The absolute speed determines the time to completely sample the field.

The dual-wedge scanner produces an irregular scan pattern. Algorithms for image reconstruction from complex patterns are known. See, for example, Robert J. Marks. *Advanced Topics in Shannon Sampling and Interpolation Theory*, Springer-Verlag, 1992.

The design of the optical components can be selected depending on the application and desired lateral and axial resolutions, as can be determined by one of ordinary skill in the microscopy field. Preferably, for a hand held device, a diameter of 2 to 3 cm and a length of 15 cm is desirable, although the device could be larger if desired. A magnification of at least 20× and more preferably at least 30× is suitable for most applications. A frame rate of at least 10 Hz is preferred for in vivo imaging, which generally necessitates the use of air bearings. The preferred resolution in an ideal sample is a lateral resolution of less than one µm and an axial resolution of less than three µm. For imaging through skin, it is recognized that the performance will degrade, so that for example, through 100 µm of skin the lateral resolution may be 1 to 5 µm and the axial resolution may be 2 to 10 µm. In one example, assuming a 30× objective with a focal length of 6 mm, a numerical aperture (NA) of the objective of 0.8, the pupil diameter is approximately 9 mm. If the scanner is placed in the pupil, the instrument diameter is 2 to 3 cm. The length, which must be sufficient to contain all the optical elements, is less than 5 times the diameter, approximately 12 to 15 cm.

The particular scanner assembly design is determined primarily by the prism diameter, rotation speed, and the speed relationship between the two. The wedge angle has lesser impact on the design, because it is relatively small and does not impact the mechanical behavior of the scanner assembly to a great extent. The scan diameter $D_{scan}$ is important for determining the scan speed. Using the telescope lens assembly described above, $D_{scan}$=(pupil diameter)/(telescope magnification). Frictional forces grow monotonically with the diameter and impact the maximum achievable scan speed. To a good approximation, the time per measurement generally equals the cycle time of the fastest scan divided by the number of spatially independent samples over the scan. The time per sample is proportional to the diameter of the light beam at the objective focus divided by the scan frequency of the faster wedge and diameter of the field of view. The objective beam diameter is proportional to the wavelength divided by the numerical aperture of the objective. Thus, on average, one sample per resolvable pixel in the field can be obtained in a time proportional to the diameter of the field of view divided by the scan frequency and the objective beam diameter.

The present invention results in a device of reduced size and cost compared to prior art confocal reflecting microscopes. The reduced size improves the portability and ease of use of confocal reflectance microscopes in the clinical setting. The present invention is particularly useful for imaging skin, such as for diagnosing non-melanoma skin cancers. The invention can also be used in endoscopic applications.

The invention is not to be limited by what has been particularly shown and described, except as indicated by the appended claims.

What is claimed is:

1. A confocal reflectance microscope system comprising:
a coherent light source operative to transmit a light beam on an optical path to a target;
a detection assembly operative to receive a reflected signal from the target, the detection assembly including an aperture and a detector; and
an optical assembly on the optical path operative to focus the light beam from the light source on a focal region of the target and to direct the reflected signal to the detection assembly;
the focal region and the aperture of the detection assembly lying in conjugate focal planes, the aperture of the detection assembly sized to pass light scattered from the focal region to the detector and reject light scattered from outside the focal region of the target;
a scanner assembly comprising a pair of prisms rotatably mounted on the optical path, the prisms including two surfaces facing each other and normal to an incident light beam axis, each prism configured to deviate the light beam by a desired angle, and a rotation mechanism operative to rotate each prism at a selected speed of rotation and in a selected direction to scan the light beam over the target and to return the reflected signal to the detection assembly; and
a controller in communication with the light source, the scanner assembly, and the detection assembly, the controller operative to determine an angular position of each prism and to determine an intensity value of the reflected signal at the detection assembly, and to display a two-dimensional image of successive reflected signals from the target.

2. The system of claim 1, wherein each prism of the pair at prisms comprises two faces arranged across the optical path, the two faces defining an acute angle, the pair of prisms arranged with opposed faces parallel.

3. The system of claim 1, wherein each prism comprises a wedge.

4. The system of claim 1, wherein each prism of the pair of prisms causes the light beam to deviate over a circular area as each prism rotates.

5. The system of claim 1, wherein the prisms are rotatable in different directions.

6. The system of claim 1, wherein the prisms are counter-rotatable.

7. The system of claim 1, wherein the prisms are rotatable in a same direction.

8. The system of claim 1, wherein the prisms are rotatable at different speeds.

9. The system of claim 1, wherein the prisms are rotatable at the same speed.

10. The system of claim 1, wherein the angles of the prisms are different.

11. The system of claim 1, wherein the angles of the prisms are the same.

12. The system of claim 1, wherein each prism is comprised of clear optical grade glass.

13. The system of claim 12, wherein each prism is coated with an anti-reflection coating.

14. The system of claim 1, wherein the scanner assembly further comprises a housing, each prism rotatably disposed within the housing.

15. The system of claim 1, wherein the scanner assembly further comprises a motor operative to rotate each prism.

16. The system of claim 1, wherein the scanner assembly further comprises air bearings operative to rotate each prism.

17. The system of claim 1, wherein the scanner assembly further comprises an encoder to determine the angular position of each prism, the encoder in communication with the controller.

18. The system of claim 17, wherein the encoder comprises an optical encoder.

19. The system of claim 1, further comprising a polarizing beam splitter on the optical path to transmit the light beam from the light source to the scanner assembly and to direct the reflected signal from the scanner assembly to the detection assembly.

20. The system of claim 19, wherein the optical assembly further comprises an objective lens and a quarter wave plate on the optical path between the polarizing beam splitter and the objective lens.

21. The system of claim 20, wherein the optical assembly further comprises a telescope lens assembly to align the light beam with the objective lens.

* * * * *

UNITED STATES PATENT AND TRADEMARK OFFICE
CERTIFICATE OF CORRECTION

PATENT NO. : 7,471,450 B2 Page 1 of 1
APPLICATION NO. : 11/244814
DATED : December 30, 2008
INVENTOR(S) : Charles A. DiMarzio et al.

It is certified that error appears in the above-identified patent and that said Letters Patent is hereby corrected as shown below:

On the Title Page, Item (74), "Lebovivi" should read --Lebovici--;

Column 2, line 11, "of he objective." should read --of the objective.--;

Column 2, line 27, "amendable" should read --amenable--;

Column 3, line 62, "ωt," should read --$\omega_2 t$,--; and

Column 8, claim 2, line 29, "pair at" should read --pair of--.

Signed and Sealed this

Ninth Day of June, 2009

JOHN DOLL
*Acting Director of the United States Patent and Trademark Office*